April 14, 1970     D. G. SMITTLE ET AL     3,506,304
TRAY ASSEMBLY FOR AN AIRCRAFT SEAT
Filed Feb. 29, 1968     3 Sheets-Sheet 1
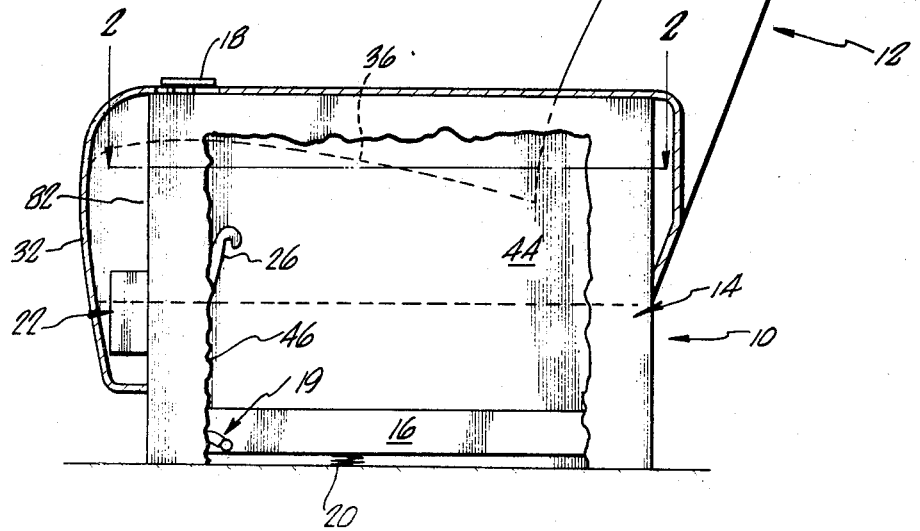
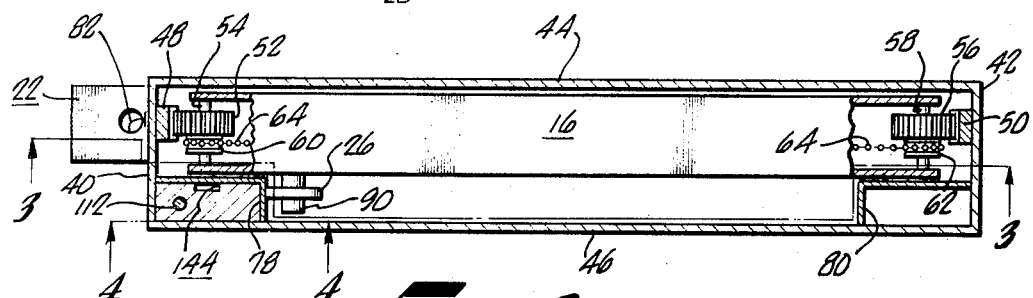
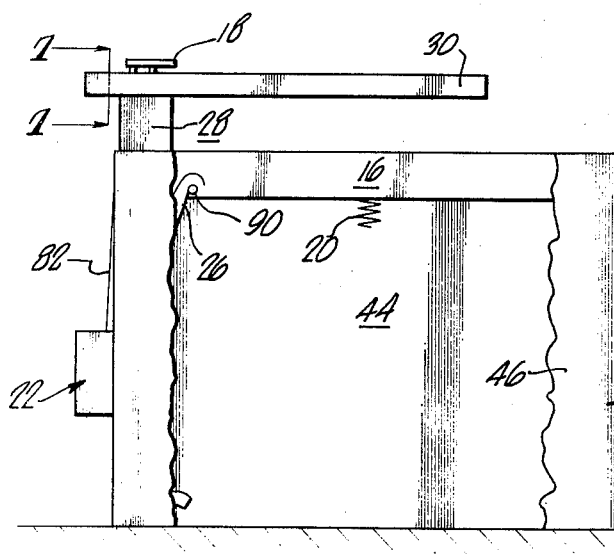
INVENTORS.
DARRELL G. SMITTLE
JOHN R. GOODWIN
WILLIAM R. WIGGINS
BY Christie, Parker & Hale
ATTORNEYS.

April 14, 1970     D. G. SMITTLE ET AL     3,506,304
TRAY ASSEMBLY FOR AN AIRCRAFT SEAT
Filed Feb. 29, 1968     3 Sheets-Sheet 2
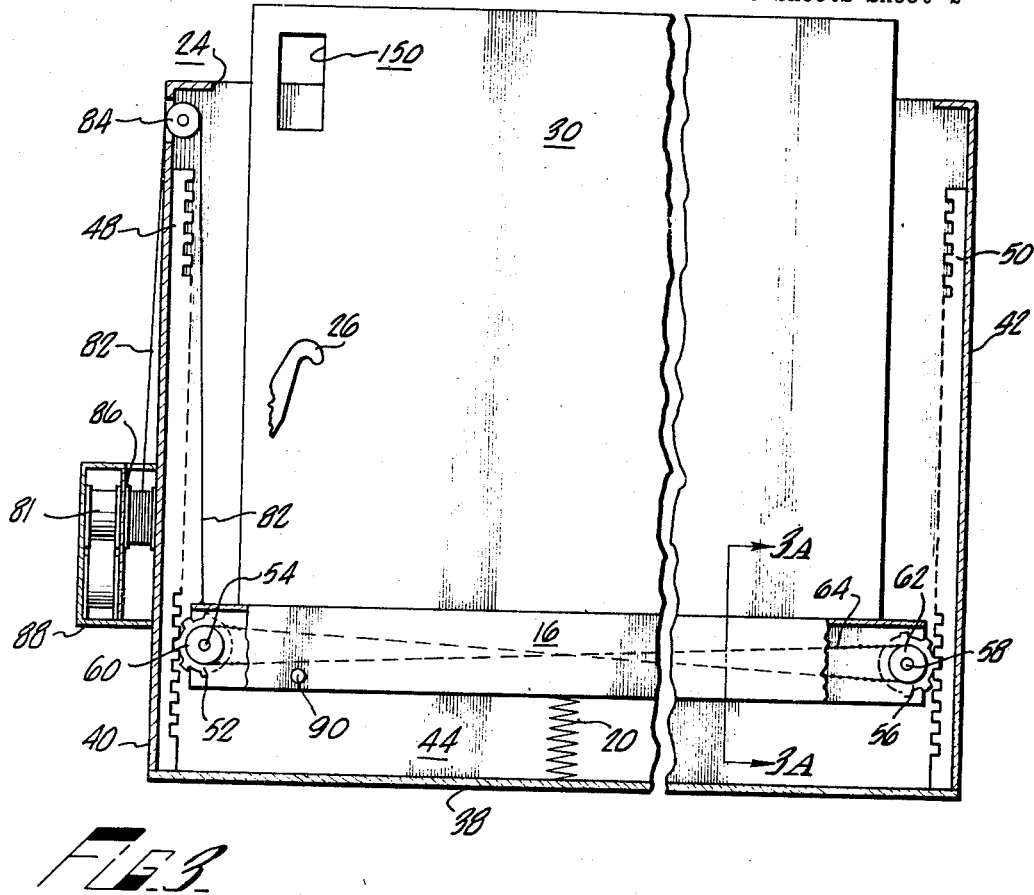
FIG 3.
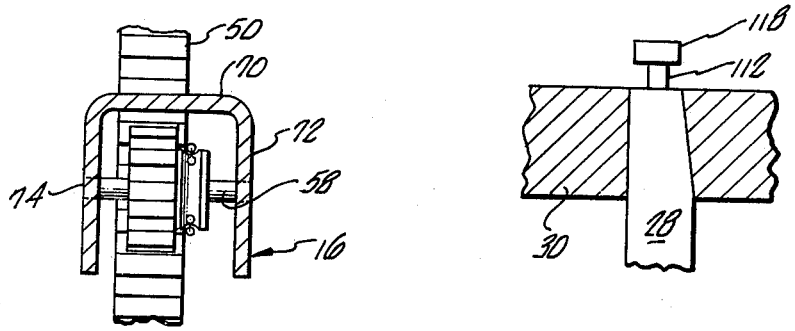
FIG 7.
FIG 3A.
INVENTORS.
DARRELL G. SMITTLE
JOHN R. GOODWIN
WILLIAM R. WIGGINS
BY Christie, Parker & Hale
ATTORNEYS.

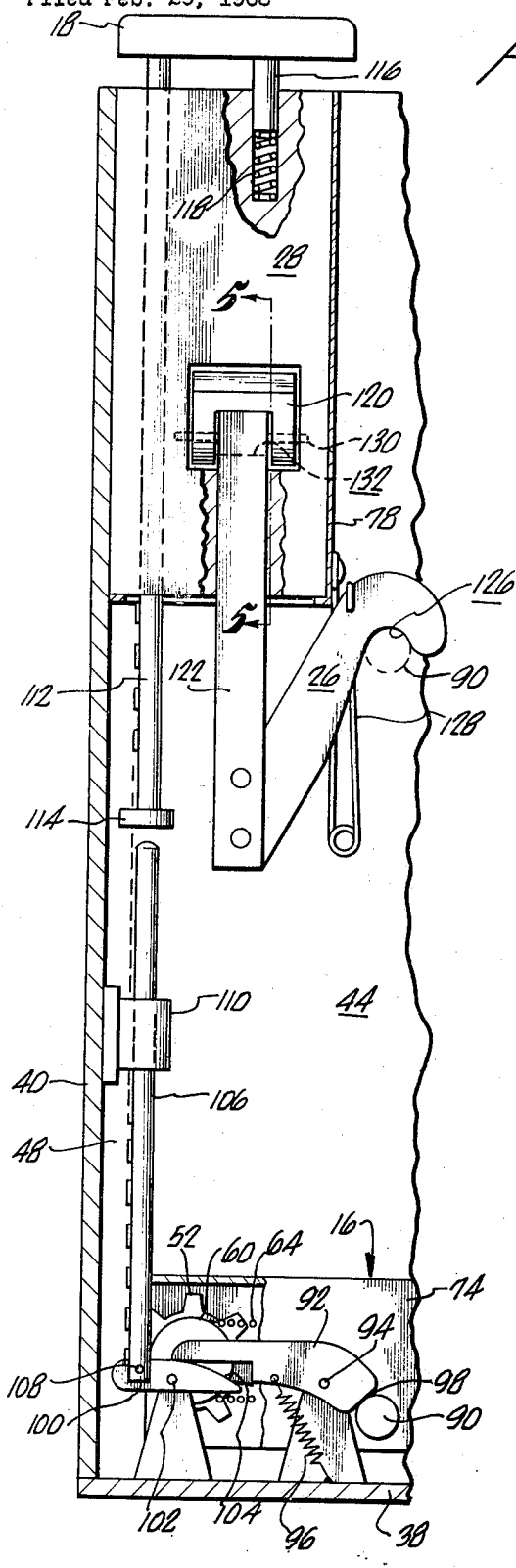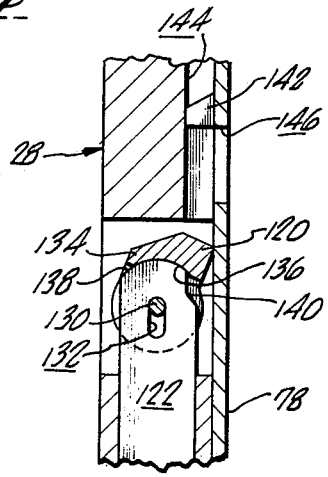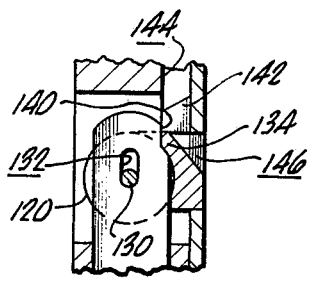
INVENTORS.
DARRELL G. SMITTLE
JOHN R. GOODWIN
WILLIAM R. WIGGINS.
BY Christie, Parker & Hale
ATTORNEYS.

3,506,304
TRAY ASSEMBLY FOR AN AIRCRAFT SEAT
Darrell G. Smittle, Malibu, John R. Goodwin, Woodland Hills, and William R. Wiggins, Gardena, Calif., assignors to Hardman Aerospace, Los Angeles, Calif., a corporation of California
Filed Feb. 29, 1968, Ser. No. 709,251
Int. Cl. A47c 7/68
U.S. Cl. 297—162                                14 Claims

ABSTRACT OF THE DISCLOSURE

An aircraft tray is normally stored in a lowered stored position in a housing beside an aircraft seat. Upon its release, a tray carriage moves vertically to a tray removal position. When the tray is removed from this latter position, the tray carriage continues vertically upward to close the tray access opening in the housing. During its vertical movement from the tray removal position, the tray carriage engages and elevates a stanchion to present a tray mount. A stanchion lock is activated as it raises to lock the stanchion in place. The tray carriage tracks on a pair of spaced-apart racks through gears. Horizontal tray carriage positioning is assured by a coordinator coupling the gears together.

BACKGROUND OF THE INVENTION

The present invention relates to tray assemblies for use in conjunction with aircraft seats. More particularly, the present invention relates to an aircraft tray assembly which may be stored laterally of an aircraft seat.

One of the commonest forms of aircraft trays is carried in the back of each aircraft seat. These trays fold into the back of their carrying seat when they are not in use. When in use, the trays depend horizontally out of the seat back to present a supporting surface for the convenience of a passenger.

Modern aircraft seating employs seat backs which may be reclined or raised for the comfort of passengers. This positioning facility often causes considerable passenger inconvenience when the tray is being used. The position of the tray is dependent on the position of the seat back and therefore is only fortuitously well placed. An additional inconvenience is created by movement of the seat back while food is on its carry tray. This movement can cause food spillage.

The placement of trays in seat backs also presents a hazardous hard surface to confront passengers during impact conditions. In addition, because of the relatively small space allotted to the trays in a seat's back, they are notoriously weak and can collapse when a relatively small force is applied to them. Collapsing can break the tray assembly or cause spillage of its supported material.

Thus, there is a need for a safe aircraft tray assembly which presents a stable, rigid platform for passengers independently of the position of neighboring passengers' seats.

SUMMARY OF THE INVENTION

The present invention contemplates an improved tray assembly which is operable to store a tray safely to the side of an aircraft seat and to maintain the tray in an elevated, stable in-use position.

In one form, the invention envisions the combination of an aircraft seat and an improved tray assembly. The tray assembly includes a tray housing disposed beside the aircraft seat having an opening in its top for the passage of a vertically stored tray. A tray is carried by a horizontally disposed tray carriage which is capable of vertical translation within the housing. Means are provided for elevating the tray from a lower storage position to an elevated tray removal position. These means may include a pair of racks on either side of the tray carriage which are engaged by gears mounted on the carriage and a spring which is operable to elevate the tray carriage to the tray removal position. Preferably, the elevating means also includes means for raising the tray carriage from the tray removal position to a position which closes the tray access opening at the top of the housing. These latter means may include, for example, a power spring coupled by a cable to the tray carriage. The power spring is operable to elevate the carriage when its carried tray is removed. Means are also provided on the housing for holding a tray in a horizontal in-use position. These means may include a stanchion which raises to its holding position when the tray carriage is being elevated from its tray removal position.

In its presently preferred form, the tray assembly of the present invention includes a stanchion lock for preventing untimely lowering of the stanchion. The stanchion lock preferably includes a latch rotatably carried by the stanchion on a pivot pin. A vertical follower rod is attached to an arm standing in the path of the tray carriage. The vertical follower rod has a vertical slot which receives the pivot pin for relative movement between the latch and the follower rod. The follower rod also has a bearing surface for raising the latch for its engagement and rotation by a sear. A notch in the follower rod engages a boss on the latch when the follower rod raises with respect to the latch to lock the stanchion in place. The engagement of the latch with the sear determines the upper position of the stanchion.

It is also preferred to have a manually releasable lock for maintaining the tray carriage in its tray storage position. This lock preferably includes a release bar disposed on top of the stanchion for manual actuation by a passenger. Means are provided to bias the release bar upwardly from the stanchion. The release bar is coupled to a dog such that downward movement of the release bar uncouples the dog from the tray carriage to allow the tray carriage to move to its tray removal position.

The tray assembly of the present invention provides the facility for easy storage of its tray laterally of its aircraft seat. When the tray is in its in-use position, the problems encountered with neighboring seat positioning on the position of the tray and stability of the tray's carried articles are overcome because the tray assembly is independent of other aircraft seats. In its stored position, the tray is beside an aircraft seat and therefore does not occupy an exposed, harzardous position. Because the space limitations necessitated by seat back mounted trays are not encountered, the tray assembly is much more rigid and provides a sounder in-use foundation.

Passenger attention to tray deployment and storage is at a minimum with the preferred tray assembly of the present invention. Actuation of a tray carriage release bar unlocks the tray carriage and the carriage elevates to a tray removal position. This position is well below the awkward position which would result if the tray carriage were elevated to the top of the housing before tray removal. After removal of the tray, the tray's in-use support stanchion is automatically brought into position by the elevation of the tray carriage. The trap support is firmly locked against downward movement from the weight of the tray and its carried articles by the stanchion lock. The opening in the top of the housing is closed by the top of the tray carriage and therefore problems of lost articles within the housing are avoided. Tray storage is readily accomplished by applying a downward force with the tray on the tray carriage. This downward force releases the tray support stanchion's lock to lower the stanchion.

Moreover, the coordinator allows the use of a reliable tray carriage track by maintaining the tray carriage horizontal regardless of forces applied to it.

These and other features, aspects and advantages of the present invention will become more apparent from the following description appended claims and drawings.

BRIEF DESCRIPTION OF THE FIGURES

FIGURE 1 is a side elevational view, partly in section, of the improved tray assembly and aircraft seat of the present invention;

FIGURE 2 is a sectional plan view taken along line 2—2 of FIGURE 1;

FIGURE 3 is a sectional elevational view of the tray assembly taken along line 3—3 of FIGURE 2;

FIGURE 3A is a fragmentary view, partly in section, taken along line 3A of FIGURE 3;

FIGURE 4 is a fragmentary elevational view, partly in section, taken along line 4—4 of FIGURE 2;

FIGURE 5 is a fragmentary view, partly in section, taken along line 5—5 of FIGURE 4;

FIGURE 5A is a view similar to FIGURE 5 showing the illustrated stanchion in its locked position;

FIGURE 6 is a side elevational view of the tray assembly illustrated in FIGURE 1 showing the tray in its in-use position and the tray carriage in its fully elevated position; and FIGURE 7 is a fragmentary view, partly in section, taken along line 7—7 of FIGURE 6.

DESCRIPTION OF THE PREFERRED EMBODIMENTS

The general combination of a tray assembly 10 and an aircraft seat 12 is illustrated in FIGURE 1. The tray assembly includes a vertically disposed housing 14, a tray carriage 16 and a tray carriage release bar 18. Release bar 18 is coupled to a lock 19 to release the lock and allow elevation of tray carriage 16. The tray assembly also provides a spring 20 for elevating tray carriage 16 to an intermediate tray removal position. The tray carriage is raised after the removal of a tray by the action of a power spring assembly 22. With brief reference to FIGURE 6, tray carriage 16 in its uppermost position closes an opening 24 in the top of the housing. As tray carriage 16 elevates from its tray removal position to its closing position, it engages an arm 26 to elevate a stanchion tray support 28. The stanchion tray support is locked in the elevated FIGURE 6 position for the mounting of a tray 30.

Tray assembly 10 is typically covered by a protective upholstered cover 32. As was previously mentioned, tray assembly 10 is disposed beside an aircraft seat 12. The top of the tray assembly functions as the seat's armrest. Briefly, aircraft seat 12 includes a seat back 34 and a horizontal seat cushion 36. The entire seat is mounted on the floor of an aircraft by a support (not shown). Because the seat may take any number of forms, it will not be described further except as it relates to the combination of an aircraft seat and a tray assembly.

FIGURES 2 and 3 illustrate the preferred construction of the tray assembly of the present invention in greater detail. Housing 14 is a deep and thin box-like structure having opening 24 in its top, a base 38, a front and a back wall 40 and 42, and two side walls 44 and 46. The base is only shown in FIGURES 3 and 4 to clarify the matter depicted in other figures. Side wall 46 is partially shown in FIGURES 1 and 6. A first rack 48 is vertically mounted to the interior side of front wall 40. A second complementray rack 50 is vertically mounted to the interior side of vertical back wall 42. A first spur gear 52 is mounted for rotation on tray carriage 16 on a shaft 54. The teeth of spur gear 52 engage the teeth of rack 48. A complementary spur gear 56 is mounted for rotation on a shaft 58 at the other end of tray carriage 16 with its teeth engaged with the teeth of rack 50. Each of these gears carries a sprocket-like wheel 60 and 62. A coordinating chain 64 is engaged by sprocket wheels 60 and 62. As seen by the phantom lines in FIGURE 3, coordinating chain 64 is in a figure eight disposition in order to provide for the correct rotational coupling of spur gears 52 and 56. The coordinating chain may be a bead chain but obviously a belt or the like may be used.

As is seen in FIGURE 3A, tray carriage 16 has a channel-shaped cross section with a horizontal tray support surface 70 and two vertical sides 72 and 74. Shafts 54 and 58 are attached to these vertical sides. Surface 70 may be upholstered for appearance. As is seen in FIGURE 2, tray carriage 16 occupies only a portion of the space available within housing 14 for reasons to become apparent as this description proceeds. Lateral support of tray carriage 16 may be provided by guides 78 and 80 as well as side wall 44.

Spring 20 is disposed to act between base 38 and tray carriage 16 to elevate the latter to an intermediate tray removal position when lock 19 is released. This intermediate tray removal position is illustrated in FIGURE 3. Tray 30 extends for a slight distance above the upper surface of tray assembly 10 for its removal by a passenger. This tray removal position is maintained by tray carriage 16 until the tray is actually removed.

After the tray is removed, a power spring 81 of spring assembly 22 acts through a cable 82 to elevate tray carriage 16 to close opening 24. The coupling of tray carriage 16 to power spring 81 is accomplished by the attachment of cable 82 at its extreme end to the carriage. Cable 82 is reeved over a pulley 84 mounted above rack 48 to wall 44. Cable 82 is wound on a reel 86 which shares a common axle with the upper portion of power spring 81. Power spring 81 has an upper and lower portion to effect the required degree of travel of cable 82. The power spring and reel are mounted to front wall 40 and a cover 88. An opening in the top of the cover provides for passage of cable 82. The power spring applies a sufficient force on tray carriage 16 to elevate it to its closing position. However, this force is insufficient to elevate carriage 16 when the weight of tray 30 is supported by it.

Tray carriage lock 19 is illustrated in FIGURE 4. The lock includes a follower pin 90 mounted to vertical side 74 of tray carriage 16. An engaging dog 92 is pivoted to base 38 by a pivot pin 94. A spring 96 is attached to dog 92 and base 38 to bias the pawl in a counterclockwise direction. Dog 92 has a camming surface 98 which engages follower pin 90 in the locked position. An arm or lever 100 is pivotally connected to base 38 by a pivot pin 102. Lever 100 has a camming surface 104 which engages dog 92 to rotate the latter clockwise and free follower 90. The freeing of follower 90 allows vertical elevation of tray carriage 16. Curved camming surface 104 of lever 100 provides a mechanical advantage in this unlocking function.

Lever 100 is rotated by an actuating rod 106. Actuating rod 106 is pivotally connected to lever 100 by a pivot pin 108 and is supported for vertical translation by a guide 110 mounted on the interior side of front wall 40. A driving rod 112 depends downwardly from release bar 18 through stanchion 28 to its terminus at head 114. Head 114 is spaced slightly above the end of actuating rod 106.

A downwardly extending biasing rod 116 extends from release bar 18 into a hole in the top of stanchion 28. A biasing spring 118 is disposed in this hole to act on rod 116 to maintain bar 18 normally above the top of stanchion 28.

Deperession of bar 18 causes driving rod 112 to contact actuating rod 106. Downward movement of actuating rod 106 rotates lever 100 in a counterclockwise direction. Upon such rotation, camming surface 104 engages dog 92 to cause the dog to rotate clockwise to disengage follower 90.

The stanchion and its lock are also illustrated in detail in FIGURE 4. The stanchion lock is also illustrated in FIGURES 5 and 5A. The lock includes a rotatable latch 120 which is coupled to a follower arm 122 and an actuating arm 26. Arm 26 includes a downwardly extending recess 126 disposed to be engaged by follower 90 of tray carriage 16. The arm is also biased in a downward direction by a spring 128 connected between it and a wall of stanchion encasing guide 78. Follower arm 122 is attached at its lower end to arm 26 and is free to travel vertically within stanchion 28 in an appropriately sized guide passage.

A pivot pin 130 is anchored in stanchion 28 through latch 120. Latch 120 is carried by pin 130. The pivot pin is received in a vertical slot 132 in follower arm 122. Latch 120 has an engaging boss 134 and a follower surface 136. Follower arm 122 has a complementary convex bearing surface 138 at its upper end normally disposed in contact with follower surface 136. Follower arm 122 also has a notch 140 in its upper lateral edge for engaging boss 134 of latch 120 to effect the stanchion lock.

Upward motion of follower arm 122 causes latch 120 to move for a distance with it by virtue of the contact of surfaces 136 and 138. A sear 142 is provided to arrest this vertical motion and rotate the latch. The sear is mounted on the interior wall of encasing guide 78. A vertical slot 144 allows stanchion 28 to move with respect to sear 142. As latch 120 moves with follower arm 122, pin 130 abuts upper portion of slot 132. When the latch strikes sear 142, it rotates in a clockwise direction. During this rotation follower arm 122 continues upward by virtue of slot 132. Eventually pivot pin 130 will abut the lower portion of slot 132. At this time latch 120 has rotated to its locking position with notch 140 engaging boss 134. The engagement of notch 140 with boss 134 prevents counterclockwise rotation and the unlocking of latch 120. Thus a downward force applied upon stanchion 28 from, for example, the weight of tray 30 does not cause unlocking. In the locking position a portion of latch 120 resides in an aperture 146 in guide 78 against the lower portion of sear 142.

In its elevated position stanchion 28 provides a mount for tray 30. This is illustrated in FIGURES 6 and 7. The inner surface of stanchion 28 is tapered to receive a complementary tapered aperture 150 in tray 30. (See FIGURE 3.)

The operation of the improved tray assembly of the present invention will now be described.

When a passenger desires a tray, he depresses release bar 18 which frees follower 90 in the manner previously described. Upon the release of follower 90 from its locking engagement with dog 92, tray carriage 16 elevates to the tray removal position shown in FIGURE 3 by virtue of the force applied by spring 20. When tray 30 is removed, the restraint provided on power spring 81 is released. Power spring 81 then reels cable 82 onto reel 86 and elevates tray carriage 16 to its closing position illustrated in FIGURE 6. In the closing position, tray carriage 16 covers opening 24 in the top of housing 14.

During the elevation of tray carriage 16 from the tray removal position, follower 90 engages arm 26 to raise follower arm 122. Follower arm 122 raises latch 120 to contact sear 142. Sear 142 rotates latch 120, and notch 140 engages boss 134 in the manner previously described. The stanchion is then locked in the position illustrated in FIGURE 6.

With the stanchion elevated to its tray holding position, tray 30 is placed over stanchion 28 such that the complementary tapers of aperture 150 and the stanchion engage as shown in FIGURE 7.

During elevation of tray carriage 16, gears 52 and 56 track in racks 48 and 50. Gear 52 will rotate counterclockwise while gear 56 rotates clockwise. Coordinator 64 insures that each gear will rotate at the same speed as its complementary gear to maintain tray carriage 16 horizontal.

When it is desired to store tray 30, the tray is merely lifted off stanchion 28 and placed on raised tray carriage 16. The weight of the tray carries tray carriage 16 downwardly into the tray removal position shown in FIGURE 3. During this downward course, arm 26 releases follower arm 122. Spring 128 then urges arm 26 down. As arm 122 lowers, it translates with respect to latch 120 because of slot 132 until pivot pin 130 abuts the top of the slot. With this relative movement between arm 122 and latch 120, notch 140 is disengaged from boss 134. The stanchion lock is then released and the stanchion lowers into the top of housing 14.

With the tray in a tray removal position, a slight downward force overcomes the upward bias of spring 20 and allows follower 90 to override dog 92 by rotating the latter clockwise against the force of spring 96. After follower 90 clears dog 92, the dog will rotate counterclockwise under the influence of spring 96 such that cam surface 98 bears against follower 90. Tray carriage 16 is then locked in its tray storage position.

What is claimed is:
1. In combination with an aircraft seat having an armrest, an improved tray assembly comprising:
   (a) a tray housing disposed beside the aircraft seat and having an opening in its top for the passage of a vertically disposed tray;
   (b) a tray carriage horizontally disposed for vertical translation, the carriage being normally in a lowered tray storage position with the tray within the housing;
   (c) means for elevating the tray carriage to prevent a tray to a passenger, the elevating means including biasing means disposed to urge the carriage from the tray storage position to an intermediate position, the intermediate position being sufficiently high to present a portion of a tray for its removal from the housing by a passenger;
   (d) a stanchion normally disposed within the housing;
   (e) means engaging the tray carriage only above the intermediate position for raising the stanchion to an elevated tray-holding position as the tray carriage rises from the intermediate position; and
   (f) manually releasable lock means for holding the carriage in the tray storage position.
2. In combination with an aircraft seat having an armrest, an improved tray assembly comprising:
   (a) a tray housing disposed beside the aircraft seat having an opening in its top for passage of a vertically disposed tray;
   (b) a tray carriage horizontally disposed for vertical translation, the carriage being normally in a lowered tray storage position with the tray within the housing;
   (c) means for elevating the tray carriage to present a tray to a passenger, said means including biasing means disposed to urge the carriage from the tray storage position to an intermediate position, the intermediate position being sufficiently high to present a portion of a tray for its removal from the housing by a passenger;
   (d) means on the housing for holding a tray in a horizontal in-use position; and
   (e) manually releasable lock means for holding the carriage in the tray storage position; and wherein the elevating means includes:
      means activated by the removal of a tray at the intermediate position to raise the tray carriage to close the opening in the housing.
3. The improvement claimed in claim 2 wherein:
   the tray holding means includes a stanchion normally disposed within the housing; and
   means is provided operable in association with the tray carriage for raising the stanchion to an ele- vated tray holding position as the tray carriage rises from the intermediate position.

4. An improved tray assembly for use with an aircraft seat comprising:
   (a) a housing adapted for placement beside the aircraft seat, the housing having an open top for the passage of a vertically disposed tray;
   (b) a tray carriage horizontally disposed in the housing for vertical translation between a lowered tray storage position with the tray in the housing to a tray removal position with a portion of the tray extending through the housing's open top;
   (c) means for elevating the tray carriage from the tray storage position to the tray removal position;
   (d) means on the housing for holding a tray in a horizontal in-use position;
   (e) means for holding the tray carriage in the tray storage position;
   (f) means for releasing the tray carriage holding means; and
   (g) means for elevating the tray carriage from the tray removal position to close the open top in the housing, such means being actuated when a tray is removed from the housing.

5. The improved tray assembly claimed in claim 4 wherein the means for elevating the tray carriage from the tray removal position includes:
   (a) a power spring; and
   (b) means coupled to the power spring and the tray carriage such that the power spring exerts an upward force on the tray carriage to raise the tray carriage and close the opening in the housing when a tray is removed, the weight of a tray preventing the power spring from raising the tray carriage until the tray is removed.

6. An improved tray assembly for use with an aircraft seat comprising:
   (a) a housing adapted for placement beside the aircraft seat, the housing having an open top for the passage of a vertically disposed tray;
   (b) a tray carriage horizontally disposed in the housing for vertical translation between a lowered tray storage position with the tray in the housing to a tray removal position with a portion of the tray extending through the housing's open top;
   (c) means for elevating the tray carriage from the tray storage position to the tray removal position; and
   (d) means on the housing for holding a tray in a horizontal in-use position; and wherein the elevating means includes:
   (e) a first and a second rack vertically disposed in the housing at either end of the tray carriage;
   (f) a first and a second gear rotatably attached to the tray carriage and engaged respectively with the first and second racks; and
   (g) a coordinator operatively coupling the first and second gears to maintain the tray carriage horizontal.

7. The improved tray assembly claimed in claim 6 wherein the tray coordinator includes a flexible member rotatably engaging the first and second gears, the flexible member being disposed in a figure eight to maintain coordinated rotation of the first and second gears.

8. The improved tray assembly claimed in claim 7 including:
   (a) releasable means for holding the tray carriage in the tray storage position;
   (b) a power spring; and
   (c) cable means coupled to the power spring and the tray carriage such that the power spring exerts an upward force on the tray carriage to raise the tray carriage and close the opening in the housing when a tray is removed, the weight of a tray preventing the power spring from raising the tray carriage until the tray is removed.

9. An improved tray assembly for use with an aircraft seat comprising:
   (a) a housing adapted for placement beside the aircraft seat, the housing having an open top for the passage of a vertically disposed tray;
   (b) a tray carriage horizontally disposed in the housing for vertical translation between a lowered tray storage position with the tray in the housing to a tray removal position with a portion of the tray extending through the housing's open top;
   (c) means for elevating the tray carriage from the tray storage position to the tray removal position; and
   (d) means on the housing for holding a tray in a horizontal in-use position including:
   a stanchion slidably disposed for vertical movement between a first position and a second position, the first position being within the housing and the second position being with a portion of the stanchion above the top of the housing;
   follower means on the tray carriage disposed to engage the stanchion at the tray removal position in the tray carriage's vertical translation; and
   a releasable stanchion lock operable to block the stanchion in the second position.

10. An improved tray assembly for use with an aircraft seat comprising:
   (a) a housing adapted for placement beside the aircraft seat, the housing having an open top for the passage of a vertically disposed tray;
   (b) a tray carriage horizontally disposed in the housing for vertical translation between a lowered tray storage position with the tray in the housing to a tray removal position with a portion of the tray extending through the housing's open top;
   (c) means for elevating the tray carriage from the tray storage position to the tray removal position; and
   (d) means on the housing for holding a tray in a horizontal in-use position including:
   a stanchion slidably disposed for vertical movement between a first position and a second position, the first position being within the housing and the second position being with a portion of the stanchion above the top of the housing;
   follower means on the tray carriage disposed to engage the stanchion at a point in the tray carriage's vertical translation; and a releasable stanchion lock operable to block the stanchion in the second position; and wherein:
   the elevating means includes means for elevating the tray carriage from the tray removal position to close the open top in the housing, such means being actuated when a tray is removed from the housing.

11. The improved tray assembly claimed in claim 10 wherein the stanchion lock includes:
   (a) a latch rotatably carried by the stanchion;
   (b) a sear disposed in the housing to rotate the latch; and
   (c) anti-rotation locking means to prevent rotation of the latch after it is rotated by the sear.

12. The improved tray assembly claimed in claim 10 wherein the releasable stanchion lock includes:
   (a) a latch rotatably carried by the stanchion through a pivot pin affixed therein, the latch having a boss;
   (b) a follow arm actuable by the tray carriage's follower means having a vertical slot and a vertical notch, the vertical slot receiving the pivot pin to couple the follower arm to the latch such that relative movement between the latch and the follower rod is possible; and
   (c) a sear disposed in the housing to rotate the latch and produce the relative movement between the follower rod and the latch, the follower rod's notch engaging the latch's boss upon such relative movement to prevent unlocking rotation of the latch.

13. The improved tray assembly claimed in claim 11 including:
 (a) a release bar disposed on top of the stanchion for manual actuation by a passenger;
 (b) means to bias the release bar upwardly from the stanchion;
 (c) a dog disposed in the housing in position to engage the tray carriage in the tray storage position; and
 (d) means coupling the dog to the release bar such that actuation of the release bar releases the tray carriage.

14. The improved tray assembly claimed in claim 13 wherein the elevating means includes:
 (a) a first and a second rack vertically disposed in the housing at either end of the tray carriage;
 (b) a first and a second gear rotatably attached to the tray carriage and engaged respectively with the first and second racks; and
 (c) a coordinator operatively coupling the first and second gears to maintain the tray carriage horizontal.

References Cited

UNITED STATES PATENTS

| | | | |
|---|---|---|---|
| 1,888,525 | 11/1932 | Callaway et al. | 297—145 X |
| 2,845,113 | 7/1958 | Keel | 297—145 |
| 2,947,348 | 8/1960 | Peckham | 297—145 |
| 3,298,735 | 1/1967 | Berman | 297—194 X |
| 3,371,956 | 3/1968 | Jordan et al. | 297—194 X |

FOREIGN PATENTS 555,531  8/1943  Great Britain.

JAMES T. McCALL, Primary Examiner

U.S. Cl. X.R.

297—194

PO-1050
(5/69)

UNITED STATES PATENT OFFICE
CERTIFICATE OF CORRECTION

Patent No. 3,506,304        Dated April 14, 1970

Inventor(s) D. G. Smittle et al

It is certified that error appears in the above-identified patent and that said Letters Patent are hereby corrected as shown below:

In the specification: Column 2, line 50, "harzardous" should be --hazardous--; line 64, "trap" should be --tray--. Column 3, line 6, after "description" insert a comma; line 69, "complementray" should be --complementary--. Column 4, line 11, "to" should be --in--; line 70, "Deperession" should be --Depression--.

In the claims: Claim 1, column 6, line 33, "prevent" should be --present--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents